(12) United States Patent
Moriai

(10) Patent No.: US 9,155,096 B2
(45) Date of Patent: Oct. 6, 2015

(54) COMMUNICATION APPARATUS AND COMMUNICATION METHOD

(75) Inventor: Shinsuke Moriai, Inuyama (JP)

(73) Assignee: KYOCERA Corporation, Kyoto (JP)

( * ) Notice: Subject to any disclaimer, the term of this patent is extended or adjusted under 35 U.S.C. 154(b) by 129 days.

(21) Appl. No.: 13/880,684

(22) PCT Filed: Oct. 7, 2011

(86) PCT No.: PCT/JP2011/073241
§ 371 (c)(1),
(2), (4) Date: Apr. 19, 2013

(87) PCT Pub. No.: WO2012/056865
PCT Pub. Date: May 3, 2012

(65) Prior Publication Data
US 2013/0215859 A1    Aug. 22, 2013

(30) Foreign Application Priority Data

Oct. 27, 2010    (JP) ................................ 2010-240673

(51) Int. Cl.
*H04W 72/04* (2009.01)
*H04B 7/08* (2006.01)
*H04B 7/06* (2006.01)

(52) U.S. Cl.
CPC ........... *H04W 72/046* (2013.01); *H04B 7/0617* (2013.01); *H04B 7/086* (2013.01)

(58) Field of Classification Search
CPC .............. H04W 16/12; H04W 72/048; H04W 72/0433
USPC ................ 370/329, 395.42, 368, 377; 455/69
See application file for complete search history.

(56) References Cited

U.S. PATENT DOCUMENTS

| 6,888,501 | B2 * | 5/2005 | Hirayama et al. ............. 342/377 |
| 6,968,169 | B2 * | 11/2005 | Miyatani ........................ 455/272 |
| 2002/0168946 | A1 * | 11/2002 | Aizawa et al. ................... 455/82 |

(Continued)

FOREIGN PATENT DOCUMENTS

| CN | 1383631 A | 12/2002 |
| CN | 1488205 A | 4/2004 |
| CN | 101156329 A | 4/2008 |

(Continued)

OTHER PUBLICATIONS

International Search Report dated Nov. 29, 2011 issued for International Application No. PCT/JP2011/073241.

(Continued)

*Primary Examiner* — Derrick Ferris
*Assistant Examiner* — Sasha Cintron Pacheco
(74) *Attorney, Agent, or Firm* — Procopio, Cory, Hargreaves & Savitch LLP

(57) ABSTRACT

In the case of setting a transmission weight to a transmitted signal, when there exists a second known signal which is received by a plurality of antennas after a first known signal used for calculation of the transmission weight and is transmitted with a transmission frequency band different from the first known signal, a transmission weight processing unit of a weight processing unit corrects the transmission weight by use of a delay amount of reception timing concerning the second known signal. Then, the transmission weight processing unit sets the corrected transmission weight to a transmitted signal.

9 Claims, 12 Drawing Sheets

(56) References Cited

U.S. PATENT DOCUMENTS

| | | | |
|---|---|---|---|
| 2003/0125040 A1* | 7/2003 | Walton et al. | 455/454 |
| 2009/0268835 A1* | 10/2009 | Imai et al. | 375/267 |

FOREIGN PATENT DOCUMENTS

| | | |
|---|---|---|
| JP | 2002-26790 A | 1/2002 |
| JP | 2008-99079 A | 4/2008 |
| JP | 2008-211311 A | 9/2008 |
| WO | 2003/041300 A1 | 5/2003 |
| WO | 2006/106862 A1 | 10/2006 |

OTHER PUBLICATIONS

International Preliminary Report on Patentability issued for International Application No. PCT/JP2011/073241.

Office Action dated Feb. 13, 2015 issued in counterpart Chinese application No. 2011800529202 and concise explanation.

* cited by examiner

F I G. 1
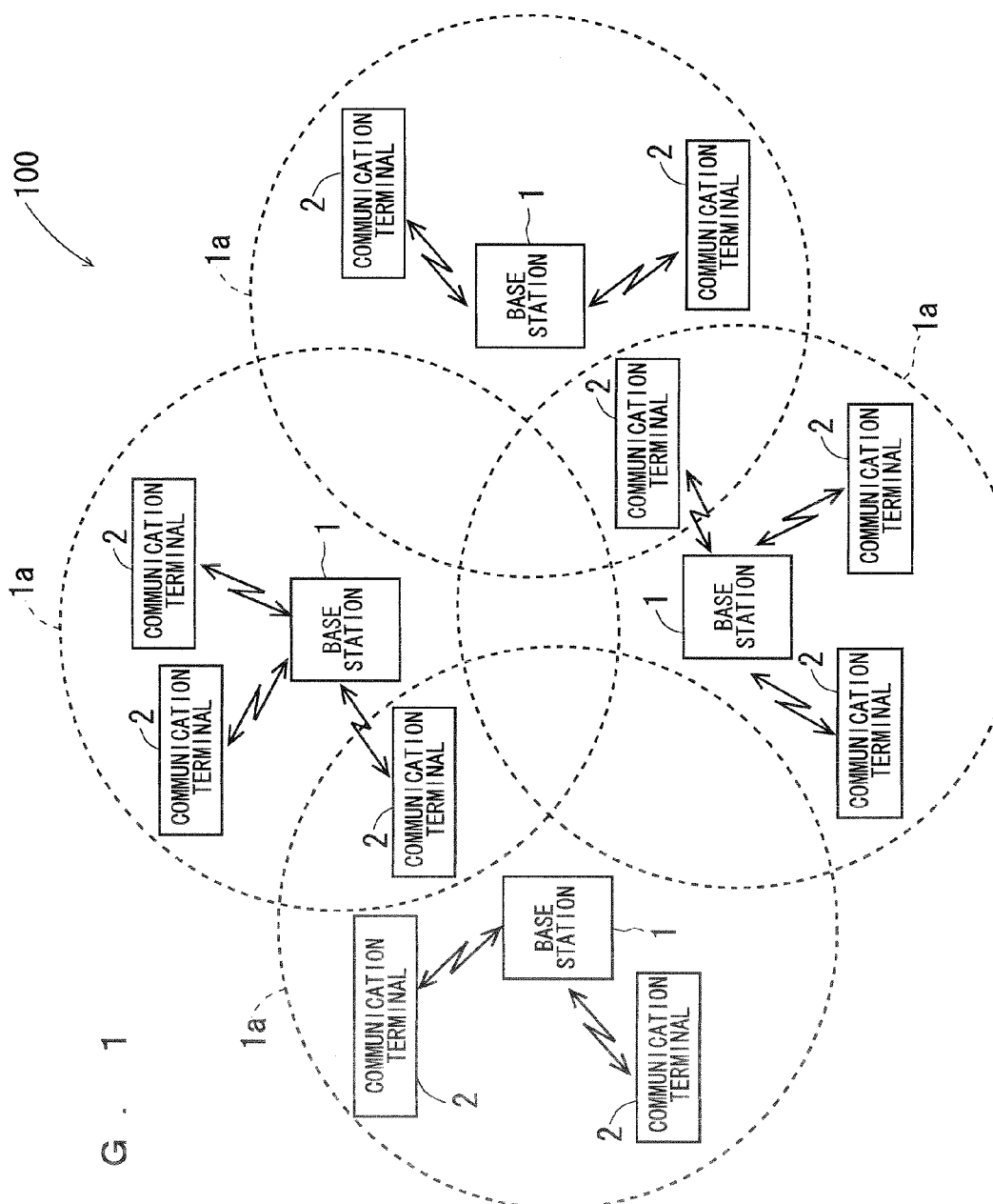

F I G . 3
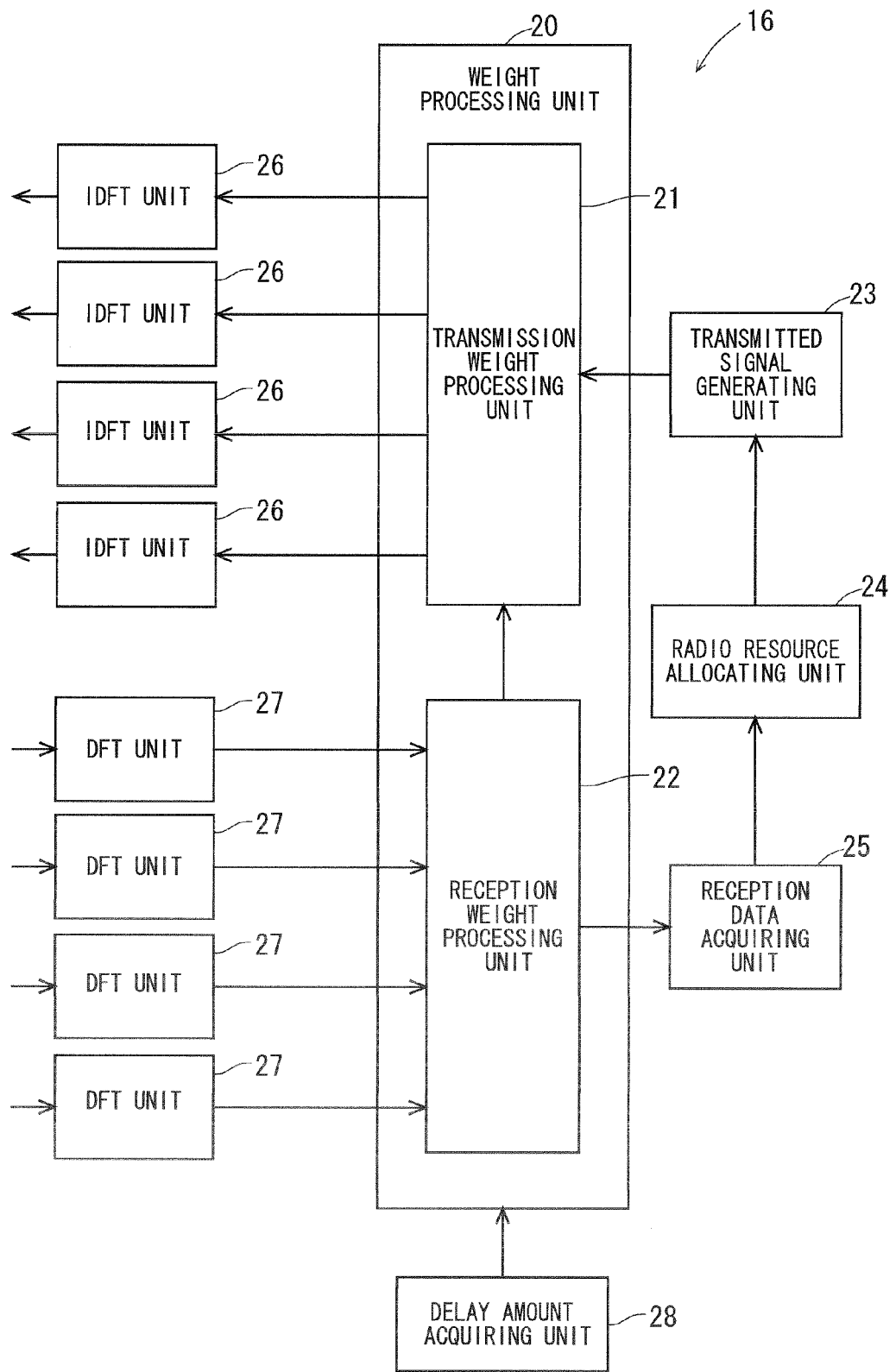

F I G . 6

| CONSTITUTION NUMBER | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

COMMUNICATION APPARATUS AND COMMUNICATION METHOD

TECHNICAL FIELD

The present invention relates to communications technology for making communications by use of a plurality of antennas.

BACKGROUND ART

There have hitherto been proposed a variety of techniques concerning radio communications. For example, in Patent Document 1, a technique concerning LTE (Long Term Evolution) is disclosed. The LTE is also called "E-UTRA.".

PRIOR ART DOCUMENT

Patent Document

Patent Document 1: Japanese Patent Application Laid-Open No. 2008-099079

SUMMARY OF THE INVENTION

Problems to be Solved by the Invention

In a communication system such as LTE, an adaptive array antenna scheme for adaptively controlling directionality of an array antenna made up of a plurality of antennas may be adopted. When a communication apparatus communicates with a communication partner apparatus by use of the adaptive array antenna scheme, a transmission weight for controlling transmission directivity of the array antenna is calculated. Then, the communication apparatus sets the calculated transmission weight to a transmitted signal transmitted from the array antenna. In order to improve transmission performance of such a communication apparatus, it is desired to improve the accuracy in transmission weight.

Accordingly, the present invention was made in light of the foregoing respect, and has an object to provide a technique capable of improving the accuracy in transmission weight for controlling transmission directivity of a plurality of antennas.

Means for Solving the Problems

The communication apparatus according to one aspect is a communication apparatus for communicating with a communication partner apparatus, which includes: a plurality of antennas; a weight processing unit for calculating a transmission weight for controlling transmission directivity of the plurality of antennas based on a known signal from the communication partner apparatus which is received by the plurality of antennas, to set the transmission weight to a transmitted signal transmitted by the plurality of antennas; and a delay amount acquiring unit for obtaining a delay amount of reception timing for the known signal, wherein in the case of setting the transmission weight to the transmitted signal, when there exists a second known signal: which is the known signal received by the plurality of antennas after the reception of a first known signal as the known signal used for calculation of the transmission weight; and whose transmission frequency band is different from a transmission frequency band of the first known signal, the weight processing unit corrects the transmission weight, using the delay amount concerning the second known signal and sets the corrected transmission weight to the transmitted signal.

Further, a communication method according to one aspect is a communication method for communicating with a communication partner apparatus by use of a plurality of antennas, the method including the steps of: (a) calculating a transmission weight for controlling transmission directivity of the plurality of antennas based on a known signal from the communication partner apparatus which is received by the plurality of antennas, to set the transmission weight to a transmitted signal transmitted by the plurality of antennas; and (b) obtaining a delay amount of reception timing for the known signal, wherein in the case of setting the transmission weight to the transmitted signal in the step (a), when there exists a second known signal: which is the known signal received by the plurality of antennas after the reception of a first known signal as the known signal used for calculation of the transmission weight; and of which transmission frequency band is different from a transmission frequency band of the first known signal, the transmission weight is corrected using the delay amount obtained in the step (b) concerning the second known signal and the corrected transmission weight is set to the transmitted signal.

Effects of the Invention

According to the present invention, the accuracy in transmission weight is improved.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram showing a configuration of a communication system.

FIG. 3 is a diagram showing a configuration of a control unit.

FIG. 6 is a diagram showing kinds of configurations of the TDD frame.

EMBODIMENT FOR CARRYING OUT THE INVENTION

Figure 2:
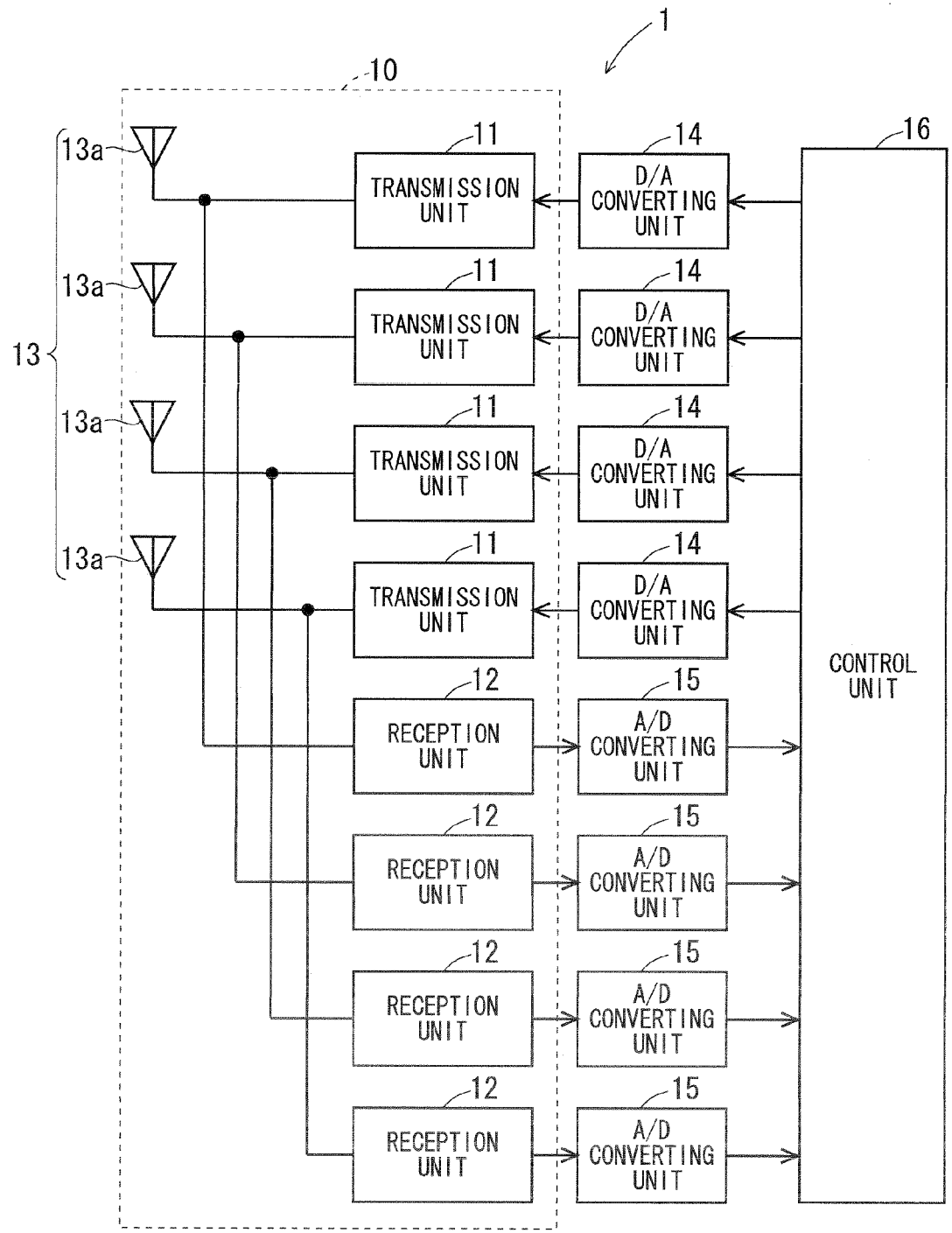
FIG. 2 is a diagram showing a configuration of a base station.

FIG. 1 is a diagram showing a configuration of a communication system 100 provided with a communication apparatus according to the present embodiment. The communication apparatus according to the present embodiment is, for example, a base station that communicates with a communication terminal. Hereinafter, the communication apparatus according to the present embodiment is referred to as a "base station 1".

The communication system 100 is, for example, LTE adopted with a TDD (Time Division Duplexing) scheme as a duplex scheme, and includes a plurality of base stations 1. The respective base stations 1 communicate with a plurality of communication terminals 2. In LTE, an OFDMA (Orthogonal Frequency Division Multiple Access) scheme is used for downlink communication, and an SC-FDMA (Single Carrier-Frequency Division Multiple Access) scheme is used for uplink communication. Therefore, the OFDMA scheme is used for transmission from the base station 1 to the communication terminal 2, and the SC-FDMA scheme is used for transmission from the communication terminal 2 to the base station 1. In the OFDMA scheme, an OFDM (Orthogonal Frequency Division Multiplexing) signal, formed by synthesizing a plurality of mutually orthogonal subcarriers, is used.

As shown in FIG. 1, a service area 1a of each base station 1 is partially superimposed on service areas 1a of peripheral base stations 1. The plurality of base stations 1 are connected to a network, not shown, and are communicable with one another through the network. A server, not shown, is connected to the network, and each base station 1 is communicable with the server through the network.

FIG. 2 is a diagram showing a configuration of each base station 1. Each base station 1 can simultaneously communicate with a plurality of communication terminals 2 by individually allocating a radio resource, specified by a two dimension made up of a time axis and a frequency axis, to each of the plurality of communication terminals 2. Each base station 1 has an array antenna as a transmission/reception antenna, and directionality of the array antenna can be controlled, using an adaptive array antenna scheme. In the present embodiment, as for the directionality of the array antenna, each base station 1 performs both beam-forming and null-steering, for example.

As shown in FIG. 2, the base station 1 is provided with a radio communication unit 10, a plurality of D/A converting units 14, a plurality of A/D converting units 15, and a control unit 16.

The control unit 16 is, for example, configured of a CPU, a DSP, a memory and the like, and has overall control on operations of the base stations 1. The control unit 16 generates a baseband transmitted signal including bit data from the network connected with the base station 1, and outputs the generated signal to each of the plurality of the D/A converting units 14. Further, the control unit 16 regenerates bit data which is included in a received signal outputted from each of the plurality of A/D converting units 15 and which is generated by the communication terminal 2. Out of the bit data regenerated by the control unit 16, bit data intended for the network is transmitted from the base station 1 to the network.

The radio communication unit 10 is provided with an array antenna 13 made up of a plurality of antennas 13a, a plurality of transmission units 11, and a plurality of reception units 12. Each antenna 13a receives a transmitted signal from the communication terminal 2. The received signals in the plurality of antennas 13a are respectively inputted into the plurality of reception units 12. Further, the transmitted signals outputted by the plurality of transmission units 11 are respectively inputted into the plurality of antennas 13a. Thereby, the signal is radio-transmitted from each antenna 13a.

Each D/A converting unit 14 converts a digital-form baseband transmitted signal, inputted from the control unit 16, to an analog-form baseband transmission signal, and outputs the converted signal. The transmitted signals outputted from the plurality of D/A converting units 14 are respectively inputted into the plurality of transmission units 11. Each transmission unit 11 converts the inputted baseband transmitted signal to a carrier-band transmitted signal, and outputs the converted signal.

Each reception unit 12 converts the inputted carrier-band received signal to a baseband received signal, and outputs the converted signal. Analog-form received signals outputted from the plurality of reception units 12 are respectively inputted into the plurality of A/D converting units 15. Each A/D converting unit 15 converts the inputted analog-form received signal to a digital-form received signal, and outputs the converted signal.

FIG. 3 is a block diagram showing a principal functional configuration of the control unit 16. As shown in FIG. 3, in the control unit 16, the CPU and the DSP execute a variety of programs in the memory, thereby to form a plurality of functional blocks such as a weight processing unit 20, a transmitted signal generating unit 23, a radio resource allocating unit 24, a reception data acquiring unit 25, a plurality of IDFT units 26, a plurality of DFT units 27 and a delay amount acquiring unit 28.

The received signals outputted from the plurality of A/D converting units 15 are respectively inputted into the plurality of DFT units 27. Each DFT unit 27 performs discrete Fourier transform (DFT: Discrete Fourier Transform) on the inputted received signal. This gives each DFT unit 27 a plurality of complex signals (complex symbols) which respectively correspond to a plurality of subcarriers constituting the inputted received signal. Hereinafter, the complex signal obtained in the DFT unit 27 is referred to as a "received complex signal". Further, a plurality of complex signals obtained in the DFT unit 27 are referred to as a "received complex signal train". The received complex signal train obtained in each DFT unit 27 is inputted into the weight processing unit 20.

The transmitted signal generating unit 23 generates bit data to be transmitted to the communication terminal 2, which includes bit data from the network, and performs an encoding process and a scrambling process on the bit data. The transmitted signal generating unit 23 then converts the bit data after processed to a plurality of complex signals on an IQ plane, which correspond to a plurality of subcarriers constituting an OFDM signal, and inputs the plurality of complex signals to the weight processing unit 20. Hereinafter, the complex signal generated by the transmitted signal generating unit 23 is referred to as a "transmission complex signal". Further, the plurality of complex signals generated by the transmitted signal generating unit 23 are referred to as a "transmission complex signal train".

Based on a known signal from the communication terminal 2, the weight processing unit 20 calculates a transmission weight for controlling transmission directivity of the array antenna 13, and a reception weight for controlling reception directionality of the array antenna 13. The weight processing unit 20 is provided with a transmission weight processing unit 21 for calculating a transmission weight, and a reception weight processing unit 22 for calculating a reception weight.

The reception weight processing unit 22 calculates a reception weight that is set to the received signal in each antenna 13a, namely the received complex signal train outputted from each DFT unit 27, by use of MMSE (Minimum Mean Square Error), for example. The reception weight can be calculated based on a known complex signal included in the transmitted signal from the communication terminal 2.

As for each of the plurality of received complex signal trains inputted respectively from the plurality of DFT units 2, the reception weight processing unit 22 sets a corresponding reception weight to (performs complex multiplication of) each of the plurality of received complex signals constituting the received complex signal train. Then, the reception weight processing unit 22 adds up the plurality of received complex signals after setting of the reception weight concerning the same subcarrier, the signals being included in the plurality of received complex signal train. Accordingly, a beam concerning the reception directionality of the array antenna 13, namely a beam concerning the reception directionality of the plurality of antennas 13*a* as a whole, is directed to one subcarrier (desired wave) from the specific communication terminal 2 so that a desired complex signal concerning the one subcarrier can be acquired. That is, in a new complex signal obtained by adding up the plurality of received complex signals after setting of a reception weight concerning the same subcarrier, the signals being included in the plurality of received complex signal trains, an interference component has been removed, and the new complex signal is acquired as a wished complex signal. The reception weight processing unit 22 acquires the wished complex signal concerning each of the plurality of subcarriers constituting the received signal, and outputs the acquired signal. As thus described, by setting the reception weight to the received signal from the communication terminal 2, the beam concerning the reception directionality of the array antenna 13 is directed to the communication terminal 2, and hence, user data transmitted from the communication terminal 2 can be appropriately received.

The transmission weight processing unit 21 prepares the inputted transmission complex signal trains just in number corresponding to the number of antennas 13*a*. These plurality of transmission complex signal trains are transmitted respectively from the plurality of antennas 13*a*. The transmission weight processing unit 21 calculates a transmission weight that is set to each transmission complex signal train, namely a transmission weight that is set to a transmitted signal transmitted from each antenna 13*a*. The transmission weight can be calculated based on the reception weight calculated in the reception weight processing unit 22. Specifically, the transmission weight processing unit 21 corrects the reception weight calculated in the reception weight processing unit 22 based on calibration information, and regards the corrected reception weight as the transmission weight. The calibration information is information generated based on a difference in characteristics between a transmission-system circuit and a reception-system circuit in the base station 1. Although the reception weight obtained in the reception weight processing unit 22 can be used as it is as the transmission weight, since there is a difference in characteristics between the transmission-system circuit and the reception-system circuit (e.g. difference in characteristics of an amplification unit between the transmission-system circuit and the reception-system circuit), it is possible, by correcting the reception weight so as to absorb the difference by use of the calibration information, to obtain an optimum transmission weight.

As for each of the inputted plurality of transmission complex signals trains, the transmission weight processing unit 21 sets a corresponding transmission weight to (performs complex multiplication of) each of the plurality of transmission complex signals constituting the transmission complex signal train. Then, the transmission weight processing unit 21 respectively inputs the plurality of transmission complex signal trains after being set with the transmission weight to the plurality of IDFT units 26. As thus described, by setting a transmission weight to a transmitted signal to be transmitted to the communication terminal 2, a beam concerning transmission directivity of the array antenna 13 is directed to the communication terminal 2, and user data can be appropriately transmitted to the communication terminal 2.

The reception data acquiring unit 25 performs an equalization process on the wished complex signal concerning each of the plurality of subcarriers constituting the received signal, which was outputted from the reception weight processing unit 22, and thereafter performs inverse discrete Fourier transform (IDFT: Inverse DFT) on the processed signal. The reception data acquiring unit 25 then performs a demodulation process on the signal obtained by execution of the inverse discrete Fourier transform, to covert the processed signal to bit data. Subsequently, the reception data acquiring unit 25 performs a descrambling process and a decoding process on the obtained bit data. Thereby in the reception data acquiring unit 25, the bit data for the base station 1, which was generated in the communication terminal 2, is regenerated. Out of this bit data, bit data intended for the network is transmitted from the base station 1 to the network.

Each IDFT unit 26 performs inverse discrete Fourier transform on the inputted transmission complex signal train. Thereby in the IDFT unit 26, a baseband OFDM signal is obtained which was formed by synthesizing a plurality of subcarriers modulated by a plurality of transmission complex signals (complex symbols) constituting the transmission complex signal train. The baseband transmitted signals generated in the plurality of IDFT units 26 are respectively inputted into the plurality of D/A converting units 14.

The radio resource allocating unit 24 allocates, to each communication terminal 2 as a communication subject, a radio resource (this may hereinafter be referred to as "downlink radio resource") which is used at the time of the base station 1 transmitting a signal to the communication terminal 2. Thereby, as for each communication terminal 2, a frequency band (subcarrier) and a communication time zone which are used for downlink communication (OFDMA scheme) are decided. The control unit 16 generates a plurality of baseband transmitted signals based on a result of allocation of the downlink radio resource in the radio resource allocating unit 24, and also inputs the plurality of transmitted signals respectively to the plurality of D/A converting units 14 on the timing based on the result of the allocation. Thereby, the radio communication unit 10 transmits a signal to each communication terminal 2, using the downlink radio resource allocated to the communication terminal 2.

The radio resource allocating unit 24 allocates, to each communication terminal 2, a radio resource (this may hereinafter be referred to as "uplink radio resource") which is used at the time of the communication terminal 2 transmitting a signal to the base station 1. Thereby, as for each communication terminal 2, a frequency band and a communication time zone which are used for uplink communication (SC-FDMA scheme) are decided. When the uplink radio resource is allocated to the communication terminal 2 in the radio resource allocating unit 24, the control unit 16 generates a notification signal for notifying the communication terminal 2 of the uplink radio resource. Then, the control unit 16 generates a plurality of baseband transmitted signals including the generated notification signals, and respectively inputs these to the plurality of D/A converting units 14. Accordingly, to each communication terminal 2, the uplink radio resource allocated to the communication terminal 2 is notified in the base station 1. Each communication terminal 2 transmits a signal to the base station 1, using the uplink radio resource notified from the base station 1.

Figure 4:
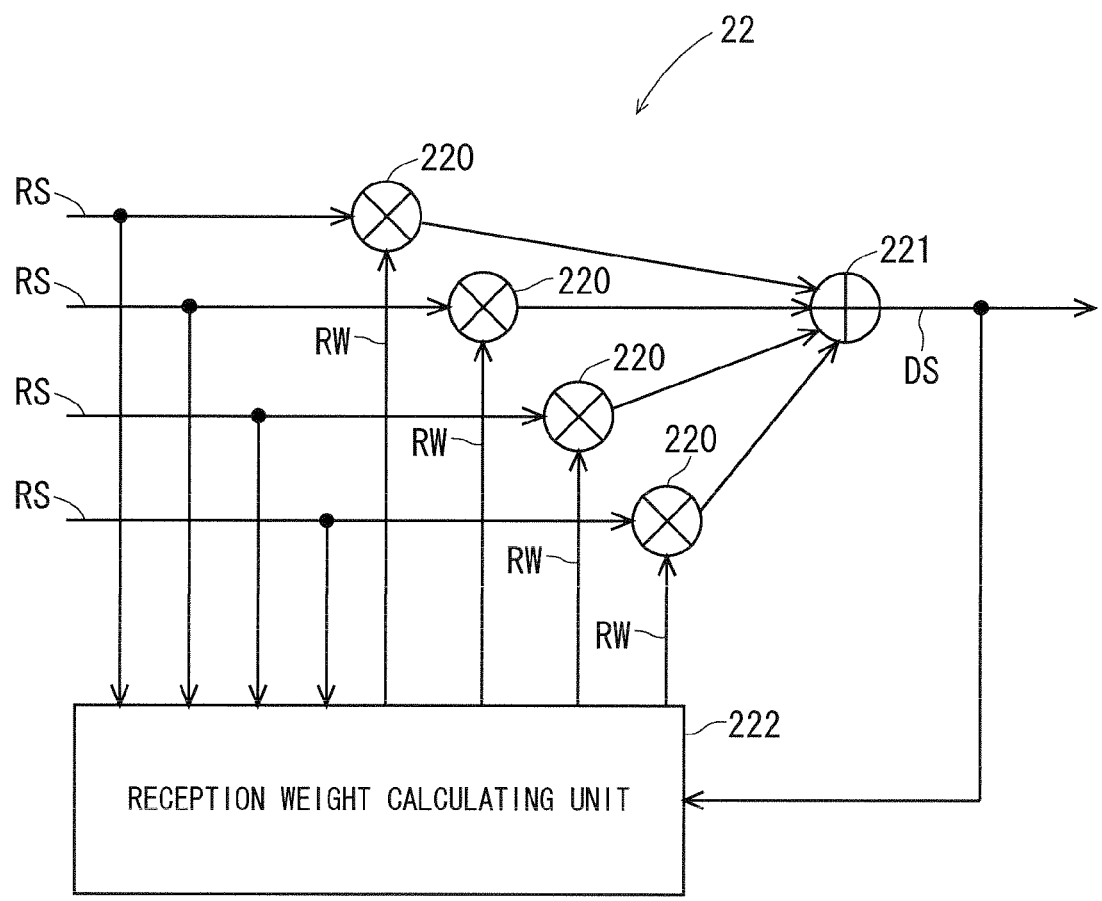
FIG. 4 is a diagram showing a configuration of a reception weight processing unit.

The delay amount acquiring unit 28 obtains a delay amount of reception timing for a known signal which is used at the time of obtaining a transmission weight. An operation of the delay amount acquiring unit 28 will later be described in detail. FIG. 4 is a block diagram showing a configuration of the reception weight processing unit 22. As shown in FIG. 4, the reception weight processing unit 22 is provided with a plurality of complex multiplication units 220, an addition unit 221, and a reception weight calculating unit 222.

received complex signals RS concerning the same subcarrier, which were acquired in the plurality of DFT units 27, are respectively inputted into the plurality of complex multiplication units 220. Further, a plurality of reception weights RW outputted from the reception weight calculating unit 222 are respectively inputted into the plurality of complex multiplication units 220. Each complex multiplication units 220 performs complex multiplication of the inputted received complex signal RS by the inputted reception weight RW, and outputs the received complex signal RS multiplied by the reception weight RW. The addition unit 221 adds up the received complex signal RS which were multiplied by the reception weight RW and outputted from each of the plurality of complex multiplication units 220, and outputs a new received complex signal thus obtained as a demodulated complex signal DS.

The reception weight calculating unit 222 generates an error signal indicating an error concerning the known demodulated complex signal DS obtained in the addition unit 221 with respect to a reference complex signal. This reference complex signal is a signal in an ideal state concerning the known demodulated complex signal DS obtained in the addition unit 221. Based on a sequential estimation algorithm, e.g. an RLS algorithm, the reception weight calculating unit 222 updates a plurality of reception weights RW a predetermined number of times by use of a plurality of known demodulated complex signals DS so as to make an error signal to be generated small. When updating the plurality of reception weights RW the predetermined number of times, the reception weight calculating unit 222 completes updating of the plurality of reception weights RW. The plurality of reception weights RW after completion of updating are inputted into the transmission weight processing unit 21. When the plurality of reception weights RW after completion of updating are respectively inputted into the plurality of complex multiplication units 220, a demodulated complex signal DS with its interference component removed, namely a wished complex signal, is outputted from the addition unit 221. Hence the wished complex signal concerning each subcarrier is outputted from the reception weight processing unit 22.

<Configuration of TDD Frame>

Next, a TDD frame 300 used between the base station 1 and the communication terminal 2 will be described. The TDD frame 300 is specified by a two dimension made up of a time axis and a frequency axis. A frequency bandwidth (system bandwidth) of the TDD frame 300 is, for example, 20 MHz and a time length of the TDD frame 300 is 10 ms. The radio resource allocating unit 24 of the base station 1 decides an uplink radio resource and a downlink radio resource to be allocated from the TDD frame 300 to each communication terminal 2.

Figure 5:
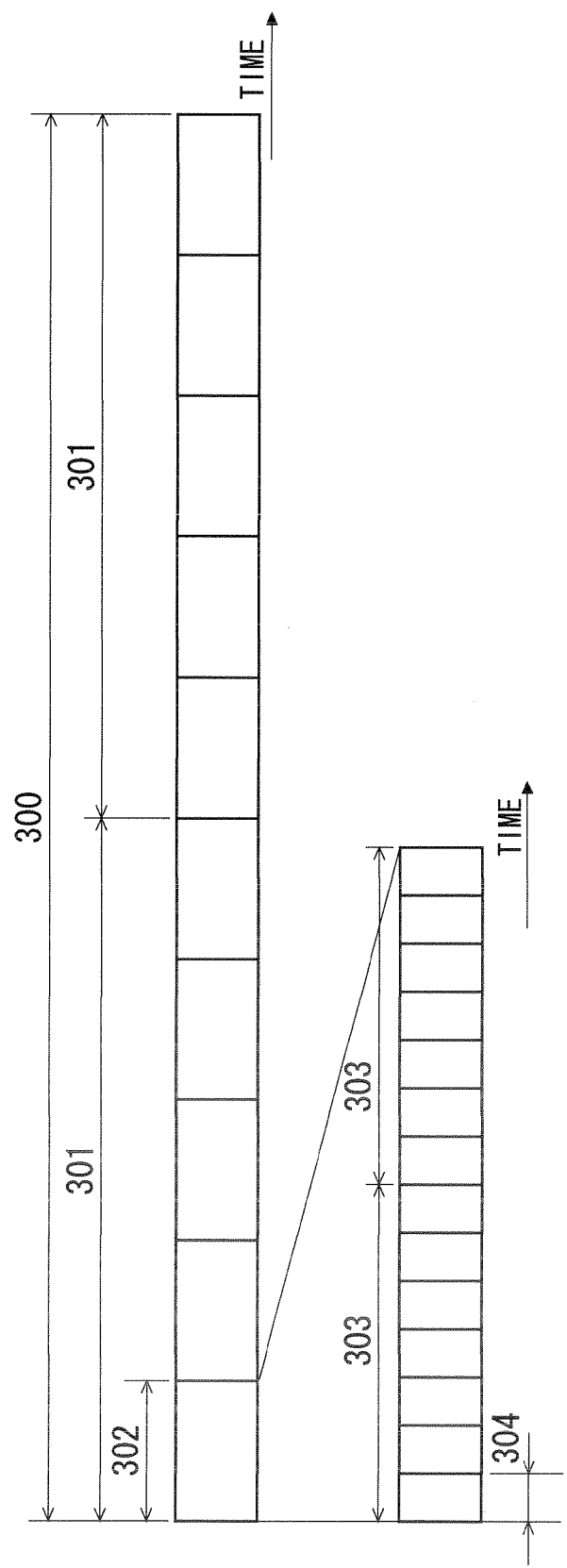
FIG. 5 is a diagram showing a configuration of a TDD frame.

FIG. 5 is a diagram showing a configuration of the TDD frame 300. As shown in FIG. 5, the TDD frame 300 is made up of two half frames 301. Each half frame 301 is configured of five subframes 302. That is, the TDD frame 300 is configured of ten subframes 302. The subframes 302 has a time length of 1 ms. Hereinafter, the ten subframes 302 constituting the TDD frame 300 may be referred to as zeroth to ninth subframes 302 in order from the beginning.

Each subframe 302 is configured of two slots 303 in the time direction. Each slot 303 is configured of seven symbol periods 304. Accordingly, each subframe 302 contains fourteen symbol periods 304 in the time direction. This symbol period 304 is one symbol period of an OFDM symbol in the OFDMA-system downlink, and is one symbol period of a DFTS (Discrete Fourier Transform Spread)—OFDM symbol in the SC-FDMA system uplink.

The TDD frame 300 configured as above contains the uplink communication-specific subframe 302 and the downlink communication-specific subframe 302. Hereinafter, the uplink communication-specific subframe 302 is referred to as an "uplink subframe 302", and the downlink communication-specific subframe 302 is referred to as a "downlink subframe 302".

In LTE, in the TDD frame 300, a region (radio resource) including a frequency bandwidth of 180 kHz in the frequency direction and a seven symbol periods 304 (one slot 303) in the time direction is called a "resource block (RB). The resource block contains 12 subcarriers. Allocation of the uplink radio resource and the downlink radio resource to the communication terminal 2 in the radio resource allocating unit 24 is performed by units of one resource block in the frequency direction. It is to be noted that, since the SC-FDMA system is used for the uplink, when a plurality of resource blocks are allocated to one communication terminal 2 in one slot 303 of the uplink subframe 302, a plurality of resource blocks continued in the frequency direction are allocated to the communication terminal 2. Hereinafter, a frequency band of one resource block is referred to as an "allocation unit band".

Further, in LTE, as for the configuration of the TDD frame 300, seven kinds of configurations in different combinations of the uplink subframe 302 and the downlink subframe 302 are defined. FIG. 6 is a diagram showing the seven kinds of configurations.

As shown in FIG. 6, in LTE, configurations of the TDD frames 300 from No. 0 to 6 are defined. In the communication system 100, one configuration out of these seven kinds of configurations is used. In FIG. 6, the subframe 302 indicated by "D" represents the downlink subframe 302, and the subframe 302 indicated by "U" represents the uplink subframe 302. Further, the subframe 302 indicated by "S" represents the subframe 302 in which a switch from downlink to uplink is made in the communication system 100. This subframe 302 is referred to as a "special subframe 302".

For example, in the TDD frame 300 having the configuration of No. 0, the zeroth and fifth subframes 302 are the downlink subframes 302, the second to fourth subframes 302 and seventh to ninth subframes 302 are the uplink subframes 302, and the first and sixth subframes 302 are the special subframes 302. Further, in the TDD frame 300 having the configuration of No. 4, the zeroth subframe 302 and the fourth to ninth subframes 302 are the downlink subframes 302, the second and third subframes 302 are the uplink subframes 302, and the first subframe 302 is the special subframe 302.

Figure 7:
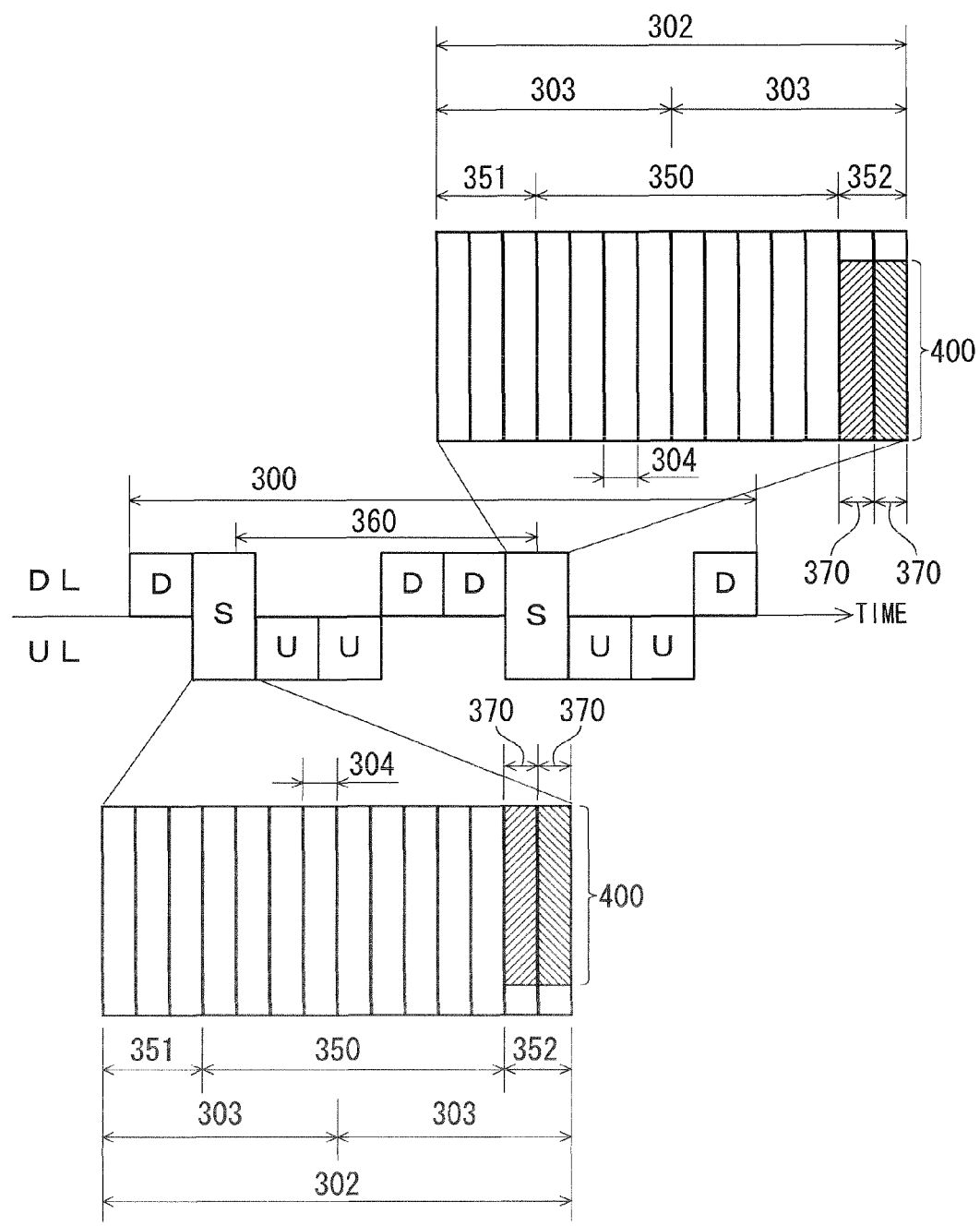
FIG. 7 is a diagram showing a detail of the configuration of the TDD frame.

FIG. 7 is a diagram showing in detail the configuration of the TDD frame 300 having the configuration of No. 1. As shown in FIG. 7, the special subframe 302 contains in the time direction a downlink pilot time slot (DwPTS) 351, a guard period (GP) 350, and an uplink pilot time slot (UpPTS) 352. The guard period 350 is a no-signal period necessary for switching from downlink to uplink, and is not used for communication. In the following description, it is assumed that the TDD frame 300 having the configuration of No. 1 is used in the communication system 100.

In LTE, as for the combination in time length among the down pilot time slot 351, the guard period 350 and the uplink pilot time slot 352, a plurality of kinds of combinations have been defined. In the example of FIG. 7, a time length of the downlink pilot time slot 351 has been set to three symbol periods 304, and a time length of the downlink pilot time slot 352 has been set to two symbol periods 304.

In the communication system 100 according to the present embodiment, downlink can be performed not only in the downlink subframe 302, but also in the downlink pilot time slot 351 of the special subframe 302. Further, in the present communication system 100, uplink can be performed not only in the uplink subframe 302, but also in the uplink pilot time slot 352 of the special subframe 302.

In the present embodiment, the base station 1 transmits data to the communication terminal 2 in each symbol period 304 of the downlink pilot time slot 351. Further, the communication terminal 2 transmits a known signal called "sounding reference signal (SRS)" in the symbol period 304 included in the uplink pilot time slot 352. The SRS is configured of a plurality of complex signals (complex symbols) that modulate a plurality of subcarriers. A symbol patterns indicated by the plurality of complex signals that constitute the SRS is known in the base station 1. Hereinafter, the complex signal constituting the SRS is called an "SRS complex signal".

In LTE, the SRS is often used at the time of estimating uplink quality, but in the present embodiment, the SRS transmitted in the uplink pilot time slot 352 is used for calculating a transmission weight. That is, the base station 1 controls the transmission directivity in the array antenna 13 based on the SRS transmitted by the communication terminal 2 in the uplink pilot time slot 352.

It should be noted that as for a reception weight that is set to a received signal which includes user data from the communication terminal 2 and is received by the array antenna 13, it is calculated based not on the SRS but on a known signal called "demodulation reference signal (DRS)" which is transmitted from the communication terminal 2 in the uplink subframe 302.

Further, the SRS is also transmittable in the last symbol period 304 of the uplink subframe 302. Hereinafter, the SRS means the SRS transmitted using the uplink pilot time slot 352, unless otherwise specified.

Further, in the present embodiment, since the SRS is transmitted to every uplink pilot time slot 352 of the special subframe 302, a period from the beginning of uplink pilot time slot 352 of the special subframe 302 to the beginning of uplink pilot time slot 352 of the subsequent special subframe 302 is called an "SRS transmission period 360".

Moreover, each symbol period 304 included in the uplink pilot time slot 352 is referred to as an "SRS transmission symbol period 370". In each special subframe 302 (in every SRS transmission period 360), each communication terminal 2 transmits the SRS, using at least one of the two SRS transmission symbol periods 370 included in the uplink pilot time slot 352.

<Transmission Frequency Band of SRS>

In the present communication system 100, the special subframe 302, in which a frequency band 400 usable for transmission of the SRS (hereinafter referred to as "SRS transmittable band 400") is arranged to the high frequency side of the system band, and the special subframe 302, in which the SRS transmittable band 400 is arranged as pulled to the low frequency side of the system band, alternately appear. That is, the SRS transmittable band 400 is alternately arranged on the high frequency side or the low frequency side of the system band in every SRS transmission period 360. In FIG. 7, the SRS transmittable band 400 is indicated by diagonal lines.

Further, in the communication system 100 according to the present embodiment, a frequency band that is used by one communication terminal 2 for transmission of the SRS (hereinafter referred to as "SRS transmission band") changes in every special subframe 302 (in every SRS transmission period 360) within the SRS transmittable band 400, and by one communication terminal 2 transmitting the SRS a plurality of times, the SRS is transmitted over the entire band of the SRS transmittable band 400. This operation is called "frequency hopping".

Figure 8:
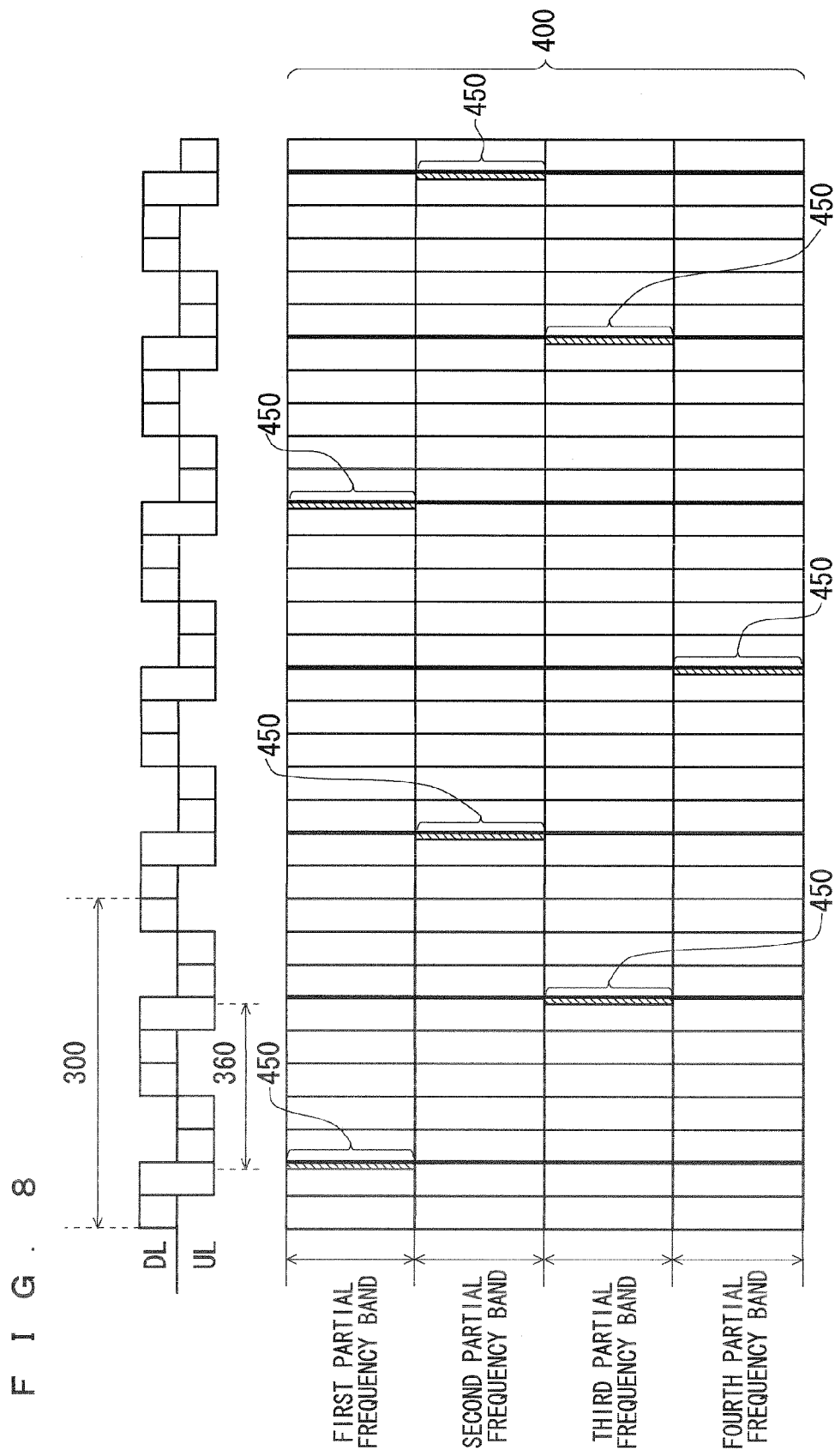
FIG. 8 is a diagram showing frequency hopping in an SRS transmission band.

FIG. 8 is a view showing one example of manners in which an SRS transmission band 450 used by one communication terminal 2 performs frequency hopping. In the example of FIG. 8, the SRS transmittable band 400 is divided into first to fourth partial frequency bands, and the SRS transmission band 450 is sequentially set to any one of the first to fourth partial frequency bands. Specifically, the SRS transmission band 450 with a bandwidth being a quarter of the bandwidth of the SRS transmittable band 400 sequentially changes to the first partial frequency band, the third partial frequency band, the second partial frequency band and the fourth partial frequency band in every SRS transmission period 360.

A width of each of the first to fourth partial frequency bands is, for example, set to as large as a frequency bandwidth of 24 resource blocks, namely to 24 times as large as a width of the allocation unit band. Hereinafter, when distinguishing the first to fourth partial frequency bands is not necessarily required, each of those is referred to as a "partial frequency band". Further, a period in which the SRS transmission band 450 changes over the whole area of the SRS transmittable band 400 is called a "hopping period". In the example of FIG. 8, the hopping period is configured of four SRS transmission periods 360. Therefore, when the four SRS transmission periods 360 have elapsed, the SRS is transmitted over the entire area of the SRS transmittable band 400.

In the base station 1, the radio resource allocating unit 24 allocates a variety of information, necessary for transmitting the SRS, to each communication terminal 2 as a communication subject. Specifically, the radio resource allocating unit 24 allocates to each communication terminal 2 the bandwidth of the SRS transmission band (hereinafter referred to as "SRS transmission bandwidth"), the SRS transmission symbol period 370 and a frequency hopping method for the SRS transmission band (how to change the SRS transmission band). The SRS transmission bandwidth coincides with the width of the above partial frequency band. Therefore, when the SRS transmission bandwidth changes, the hopping period also changes.

The transmitted signal generating unit 23 generates a transmitted signal including a control signal for notifying the communication terminal 2 of the SRS transmission bandwidth and the like allocated to the communication terminal 2, in the radio resource allocating unit 24. This transmitted signal is transmitted from the radio communication unit 10 toward the communication terminal 2. This allows each communication terminal 2 to recognize the SRS transmission bandwidth, the SRS transmission symbol period 370 and the frequency hopping method for the SRS transmission band, which have been allocated to its own. Each communication terminal 2 transmits the SRS in every SRS transmission period 360 based on the SRS transmission bandwidth allocated to its own, and the like.

It is to be noted that the above control signal is called an "RRCConnectionReconfiguration message" in LTE. Further, in LTE, a variety of parameters have been set for notifying the communication terminal 2 of the SRS transmission bandwidth and the like. For example, the SRS transmission bandwidth is decided by a parameter $C_{SRS}$ called "srs-BandwidthConfig" and a parameter $B_{SRS}$ called "srs-Bandwidth", and by notifying the communication terminal 2 of values of the parameters $C_{SRS}$ and $B_{SRS}$, it is possible to notify the communication terminal 2 of the SRS transmission bandwidth.

<Basic Operation of Base Station at the Time of Setting Transmission Weight to Transmitted Signal>

Subsequently, there will be described a basic operation at the time of the base station 1 setting a transmission weight to a transmitted signal to be transmitted to the communication terminal 2. Hereinafter, the communication terminal 2 as a subject of description may be referred to as a "subject communication terminal 2".

In the base station 1 according to the present embodiment, as for a transmitted signal to be transmitted to the subject communication terminal 2 in one SRS transmission period 360, a transmission weight is in principle calculated based on the SRS which have a transmission frequency band including a frequency band of the transmitted signal and which is transmitted by the subject communication terminal 2 in the SRS transmission period 360 (more precisely, the transmission weight is calculated based on a reception weight calculated based on the SRS), and the transmission weight is set to the transmitted signal.

However, when the SRS which have a transmission frequency band including the frequency band of the transmitted signal is not transmitted in one SRS transmission period 360 in which the transmitted signal is transmitted, a transmission weight is set to the transmitted signal, the weight having been calculated based on the SRS which have a transmission frequency including the frequency band of the transmitted signal and which is transmitted in another SRS transmission period 360 before that one SRS transmission period 360 and being as close to that one SRS transmission period 360 as possible. Hereinafter, a specific example of a setting method for a transmission weight to a transmitted signal will be described with reference to FIG. 9.

Figure 9:
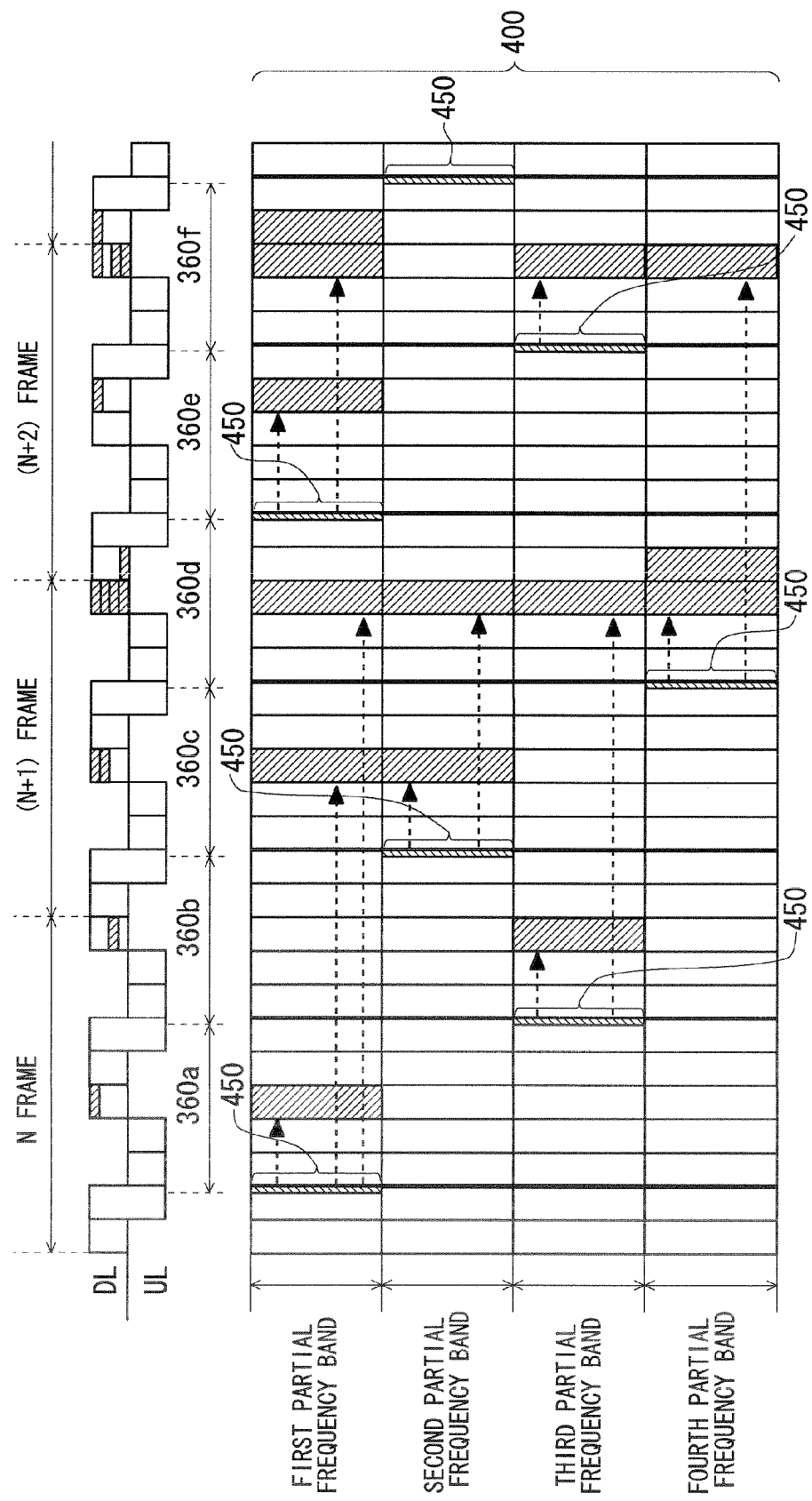
FIG. 9 is a diagram for explaining a setting method for a transmission weight to a transmitted signal.

FIG. 9 is a diagram showing an example of allocating the downlink radio resource to the subject communication terminal 2. In FIG. 9, the downlink radio resource allocated to the subject communication terminal 2 in the radio resource allocating unit 24 is indicated by diagonal lines from top left to bottom right. Further in FIG. 9, six SRS transmission periods 360, which appear in the Nth TDD frame 300 to the (N+2)th TDD frame 300, are referred to as SRS transmission periods 360a to 360f in order from the beginning.

In FIG. 9, for example as for a transmitted signal in the first partial frequency band which is transmitted to the subject communication terminal 2 in the SRS transmission period 360a, in accordance with the principle, a transmission weight is calculated based on an SRS of which SRS transmission band 450 is the first partial frequency band and which is transmitted from the subject communication terminal 2 in the SRS transmission period 360a, and the transmission weight is set to the transmitted signal.

Further, as for a transmitted signal in the third partial frequency band which is transmitted to the subject communication terminal 2 in the SRS transmission period 360b, a transmission weight is calculated based on an SRS of which SRS transmission band 450 is the third partial frequency band and which is transmitted from the subject communication terminal 2 in the SRS transmission period 360b, and the transmission weight is set to the transmitted signal.

Moreover, as for a transmitted signal in the fourth partial frequency band which is transmitted to the subject communication terminal 2 in the SRS transmission period 360d (a transmitted signal in the fourth partial frequency band which is transmitted in the ninth subframe of the (N+1)th TDD frame 300 and a transmitted signal in the fourth partial frequency band which is transmitted in the zeroth subframe of the (N+2)th TDD frame 300), a transmission weight is calculated based on an SRS of which SRS transmission band 450 is the fourth partial frequency band and which is transmitted from the subject communication terminal 2 in the SRS transmission period 360d, and the transmission weight is set to the transmitted signal.

As opposed to this, for example as for a transmitted signal in the first partial frequency band which is transmitted to the subject communication terminal 2 in the SRS transmission period 360c, since an SRS, of which SRS transmission band 450 is first partial frequency band, is not transmitted from the subject communication terminal 2 in the SRS transmission period 360c, a transmission weight is set to the transmitted signal, the weight having been calculated based on the SRS of which SRS transmission band 450 is first partial frequency band and which is transmitted in the SRS transmission period 360a before the SRS transmission period 360c. At this time, the transmission weight is corrected and then set to the transmitted signal. This correction method will later be described in detail.

Further, as for a transmitted signal in the first partial frequency band which is transmitted in the SRS transmission period 360d, since an SRS of which the SRS transmission band 450 is first partial frequency band is not transmitted in the SRS transmission period 360d, a transmission weight is corrected and set to the transmitted signal, the weight having been calculated based on the SRS of which the SRS transmission band 450 is first partial frequency band and which is transmitted in the SRS transmission period 360a before the SRS transmission period 360d.

Moreover, as for a transmitted signal in the second partial frequency band which is transmitted in the SRS transmission period 360d, since an SRS of which the SRS transmission band 450 is second partial frequency band is not transmitted in the SRS transmission period 360d, a transmission weight is corrected and set to the transmitted signal, the weight having been calculated based on the SRS of which the SRS transmission band 450 is second partial frequency band and which is transmitted in the SRS transmission period 360c before the SRS transmission period 360d.

Moreover, as for a transmitted signal in the first partial frequency band which is transmitted in the SRS transmission period 360f (a transmitted signal in the first partial frequency band which is transmitted in the ninth subframe of the (N+2)th TDD frame 300 and a transmitted signal in the first partial frequency band which is transmitted in the zeroth subframe of the subsequent TDD frame 300), since an SRS of which the SRS transmission band 450 is first partial frequency band is not transmitted in the SRS transmission period 360f, a transmission weight is corrected and set to the transmitted signal, the weight having been calculated based on the SRS of which the SRS transmission band is first partial frequency band and which is transmitted in the SRS transmission period 360e before the SRS transmission period 360f.

In the weight processing unit 20, at the time of calculating a transmission weight that is set to a transmitted signal to be transmitted to the communication terminal 2, first in the reception weight processing unit 22, a reception weight is calculated based on a plurality of SRS complex signals transmitted using the same frequency band as the frequency band of the transmitted signal, out of a plurality of SRS complex signals constituting the SRS for use in calculation of the transmission weight. Thereafter, in the transmission weight processing unit 21, a transmission weight is calculated based on the reception weight obtained in the reception weight calculating unit 222.

Further, in the weight processing unit 20, the transmission weight is calculated for example in each allocation unit band. For example, assuming that the frequency band of the transmitted signal to be transmitted to the subject communication terminal 2 is configured of four allocation unit bands, a transmission weight is obtained concerning each of the four allocation unit bands. The transmission weight that is set to the transmitted signal to be transmitted to the subject communication terminal 2 by use of one allocation unit band is obtained based on 12 SRS complex signals transmitted using that allocation unit band, out of a plurality of SRS complex signals constituting the SRS received from the subject communication terminal 2. With one resource block containing 12 subcarriers, 12 complex signals can be transmitted using one allocation unit band. There will hereinafter be described in detail a calculation method for a transmission weight that is set to a transmitted signal to be transmitted to the subject communication terminal 2 by use of one allocation unit band. Hereinafter, an allocation unit band as a subject of description is referred to as a "subject allocation unit band".

In the reception weight processing unit 22, as for the demodulated complex signal DS that is outputted from the addition unit 221 and corresponds to one SRS complex signal out of the 12 SRS complex signals transmitted using the subject allocation unit band, the reception weight calculating unit 222 obtains an error signal that indicates an error between the demodulated complex signal DS and a reference complex signal corresponding thereto. Then, using the obtained error signal, the reception weight calculating unit 222 updates a plurality of reception weights RW once. The reception weight calculating unit 222 performs this process on each of the 12 SRS complex signals which are transmitted using the subject allocation unit band. Thereby, the plurality of reception weights RW are updated twelve times, and updates of the plurality of reception weights RW is completed. The transmission weight processing unit 21 calculates a plurality of transmission weights respectively corresponding to the plurality of antennas 13a based on the plurality of reception weights RW whose updates were completed in the reception weight processing unit 22. Thereby, as for each antenna 13a, the transmission weight is calculated which is set to the transmitted signal transmitted using the subject allocation unit band.

It is to be noted that as in FIG. 9, for example when a frequency band of a transmitted signal transmitted using at least part of the first partial frequency band in the SRS transmission period 360c coincides with a frequency band of a transmitted signal transmitted using at least part of the first partial frequency band in the SRS transmission period 360a, it is not necessary to obtain a transmission weight in the SRS transmission period 360c. In this case, a transmission weight calculated concerning the transmitted signal in the SRS transmission period 360a can be set to the transmitted signal in the SRS transmission period 360c.

As opposed to this, differently from FIG. 9, when a frequency band of a transmitted signal transmitted using at least part of the first partial frequency band in the SRS transmission period 360c differs from a frequency band of a transmitted signal transmitted using at least part of the first partial frequency band in the SRS transmission period 360a, a transmission weight calculated concerning the transmitted signal in the SRS transmission period 360a cannot be set to the transmitted signal in the SRS transmission period 360c. Hence in this case, a transmission weight that is set to a transmitted signal in the SRS transmission period 360c is re-calculated based on an SRS transmitted in the SRS transmission period 360a.

<Acquirement Method for Delay Amount of Reception Timing for SRS>

As understood from the foregoing description, a transmission weight concerning a transmitted signal transmitted using a subject allocation unit band is calculated based on a reception weight calculated using 12 SRS complex signals transmitted using the subject allocation unit band and 12 reference complex signals respectively corresponding to the 12 SRS complex signals. Hereinafter, a transmission weight that is set to a transmitted signal to be transmitted using one allocation unit band is referred to as a "unit transmission weight", and a reception weight that is used at the time of obtaining the unit transmission weight is referred to as a "unit reception weight". Further, the unit transmission weight and the unit reception weight are collectively referred to as a "unit weight". Moreover, 12 SRS complex signals that are used at the time of obtaining a unit weight are collectively referred to as an "SRS signal train". Then, 12 reference complex signals that are used at the time of obtaining a unit weight are collectively referred to as a "reference signal train".

The delay amount acquiring unit 28 according to the present embodiment obtains a delay amount of reception timing for an SRS signal train in the base station 1. Specifically, the delay amount acquiring unit 28 first calculates a correlation value between an SRS signal train received in one antenna 13a and a reference signal train corresponding thereto, while gradually delaying a phase of the reference signal train. The delay amount acquiring unit 28 then regards, as a delay amount of reception timing for the SRS signal train in the base station 1, a delay amount of the phase of the reference signal train where the calculated correlation value is the maximum, namely a delay amount of the phase of the reference signal train that correlates with the SRS signal train received in one antenna 13a. From the fact that the reference signal train whose phase is delayed only by α correlates with the SRS signal train, reception timing for the SRS signal train in the base station 1 can be considered as delayed only by the time corresponding to α, whereby this α is regarded as a delay amount of reception timing for the SRS signal train in the base station 1 in the present embodiment.

The delay amount acquiring unit 28 acquires a delay amount of reception timing for the SRS signal train every time the reception weight calculating unit 222 calculates a unit reception weight based on an SRS signal train received in the array antenna 13. When X (X is an integer equal to or greater than 1) unit reception weights are calculated based on X SRS signal trains out of a plurality of SRS transmitted signal trains that constitute an SRS to be received in one SRS transmission period 360, the delay amount acquiring unit 28 regards an average value of delay amounts of reception timing for the X SRS signal trains as a delay amount β of the reception timing for the SRS. However, when X=1, the delay amount of reception timing for the SRS signal trains, contained in the SRS, as it is becomes the delay amount β of reception timing for the SRS. This delay amount β is used for an undermentioned correction process for a transmission weight.

<Correction Process for Transmission Weight>

As described using FIG. 9, in the base station 1, when an SRS, whose transmission frequency includes a frequency band of a transmitted signal transmitted in one SRS transmission period 360, is transmitted in the SRS transmission period 360, it is possible to calculate a transmission weight based on the SRS transmitted in timing close to transmission timing for the transmitted signal. Hence in this case, the accuracy in transmission weight can be sufficiently ensured.

As opposed to this, when an SRS, whose transmission frequency includes a frequency band of a transmitted signal transmitted in one SRS transmission period 360, is not transmitted in the SRS transmission period 360, a transmission weight is set to the transmitted signal, the weight having been calculated based on the SRS transmitted in another SRS transmission period 360 before that one SRS transmission period 360. In this case, since the transmission weight that is set to the transmitted signal is calculated based on the SRS transmitted in timing distant from the transmission timing for the transmitted signal, it may not be possible to sufficiently ensure the accuracy in the transmission weight.

Accordingly in the present embodiment, when a transmission weight, that is set to a transmitted signal, is calculated based on an SRS that is transmitted in timing distant from transmission timing for the transmitted signal, the transmission weight is corrected, thereby to improve the accuracy in transmission weight. Hereinafter, this correction process will be described in detail.

In the transmission weight processing unit 21 according to the present embodiment, in the case of setting a transmission weight to a transmitted signal, when another SRS exists which is received in the array antenna 13 after the SRS used for calculation of the above transmission weight and which is also transmitted in a different transmission frequency band from that for the above SRS, the above transmission weight is corrected using the delay amount $\beta$ of reception timing for another SRS. At this time, it is desirable to use another SRS that is received in timing as close to the transmission timing for the above transmitted signal as possible. The transmission weight processing unit 21 then sets the transmission weight after corrected to a transmitted signal. In the transmission weight processing unit 21, the correction process is performed on every unit transmission weight. In the transmission weight processing unit 21, in the case of setting a unit transmission weight to a transmitted signal in one allocation unit band, when another SRS exists which is received in the array antenna 13 after the SRS (SRS signal train) used for calculation of the above unit transmission weight and which is also transmitted in a different transmission frequency band from that for the above SRS, the above unit transmission weight is corrected using the delay amount $\beta$ of reception timing for another SRS.

Figure 10:
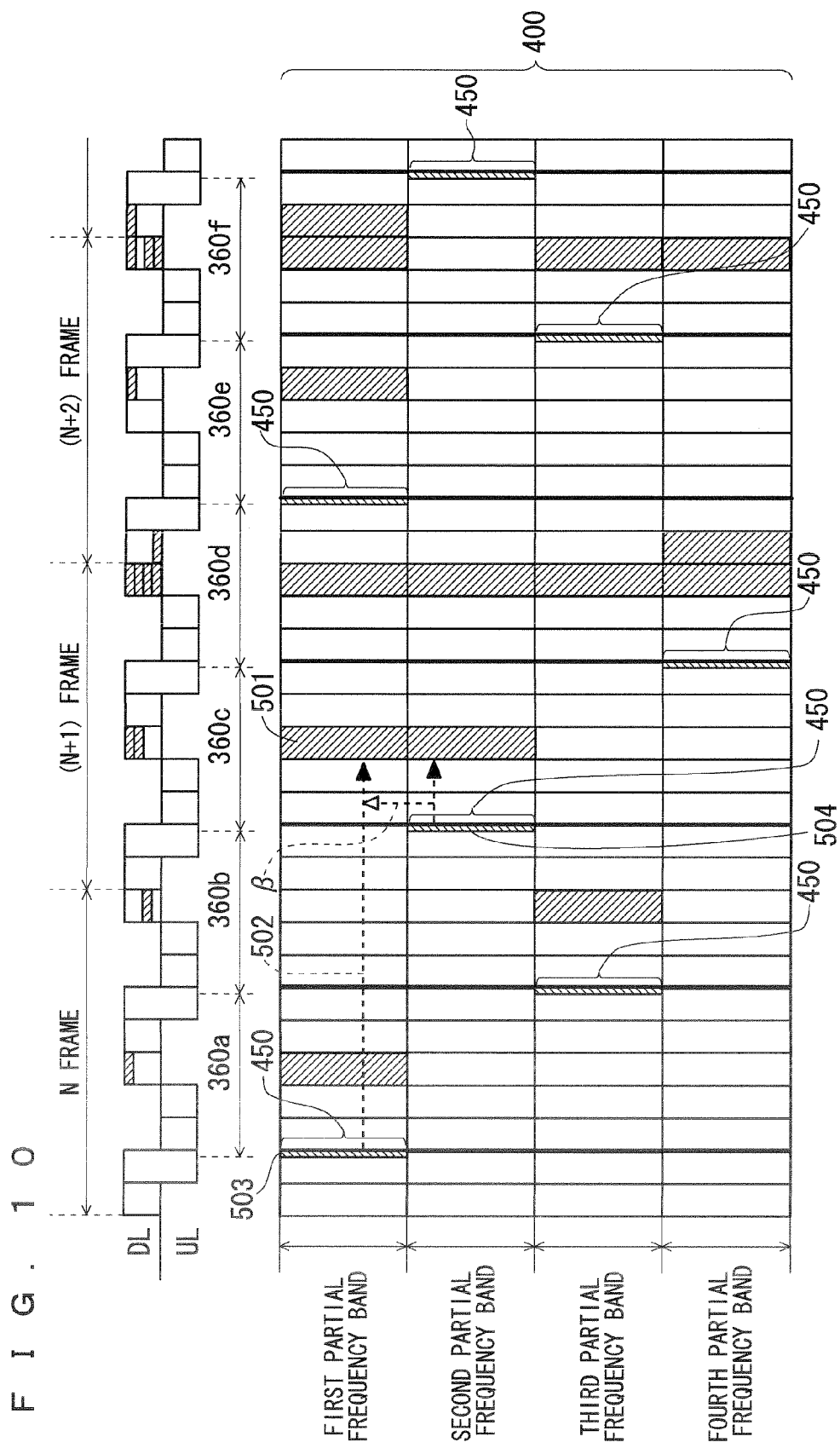
FIG. 10 is a diagram for explaining a correction method for the transmission weight.

FIG. 10 is a diagram for explaining a correction process for a transmission weight concerning the subject communication terminal 2 in the transmission weight processing unit 21. In FIG. 10, a downlink radio resource as in FIG. 9 is allocated to the subject communication terminal 2. A transmission weight that is set to a transmitted signal 501 in the first partial frequency band which is transmitted in the SRS transmission period 360c of FIG. 10 is considered as a subject of description, and a correction process for this transmission weight will be described in detail. Hereinafter, a transmission weight as a subject for the description is referred to as a "subject transmission weight", and a transmitted signal to which the subject transmission weight is set is referred to as a "subject transmitted signal". Further, the SRS used for calculation of the subject transmission weight is referred to as a "subject SRS".

A subject transmission weight 502 that is set to a subject transmitted signal 501 is calculated based on a subject SRS 503 that is received in the array antenna 13 in the SRS transmission period 360a before the SRS transmission period 360c. That is, the subject transmission weight 502 is calculated based on the subject SRS 503 transmitted in timing (SRS transmission period 360a) distant from the transmission timing (SRS transmission period 360c) for the subject transmitted signal 501.

Meanwhile, as an SRS which is received in the array antenna 13 after the subject SRS 503 and of which SRS transmission band 450 is different from that of the subject SRS 501 and which is received in the array antenna 13 in timing as close to the transmission timing for the subject transmitted signal 501 as possible, there exists an SRS 504 of which SRS transmission band 450 is second partial frequency band and which is transmitted in the SRS transmission period 360c. The transmission weight processing unit 21 corrects the subject transmission weight 502 based on a delay amount $\beta$ of reception timing for this SRS 504. Hereinafter, an SRS where a delay amount $\beta$ that is used at the time of correcting the subject transmission weight is regarded as a delay amount of the reception timing is referred to as an "immediate SRS".

Herein, upon a change in relative distance between the subject communication terminal 2 and the base station 1, the delay amount $\beta$ of the reception timing for the SRS from the subject communication terminal 2 in the base station 1 changes. Hence the delay amount $\beta$ indicates the relative distance between the subject communication terminal 2 and the base station 1. Since the foregoing immediate SRS 504 is transmitted in timing close to the transmission timing for the subject transmitted signal 501, it can be said that the delay amount $\beta$ of reception timing for the immediate SRS 504 indicates the relative distance between the subject communication terminal 2 and the base station 1 in timing close to the transmission timing of the subject transmitted signal 501. Accordingly, by correcting the subject transmission weight 502 based on the delay amount $\beta$ of reception timing for the immediate SRS 504, namely by controlling the transmission directivity of the array antenna 13 at the time of transmitting the subject transmitted signal 501 based on the delay amount $\beta$, the subject transmitted signal 501 can be reliably transmitted to the subject communication terminal 2.

<Example of Correction of Transmission Weight>

Next, there will be described specifically how the subject transmission weight is corrected using the delay amount $\beta$ of reception timing for the immediate SRS.

Figure 11:
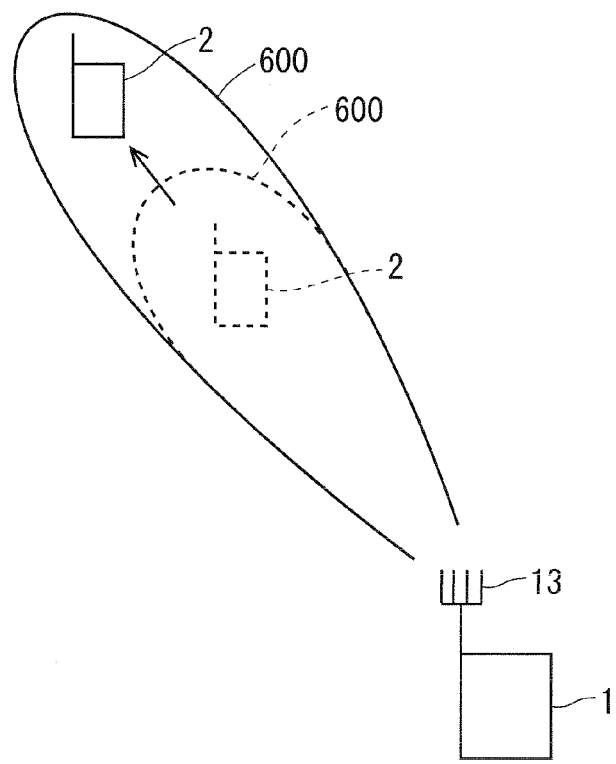
FIG. 11 is a view showing one example of beams concerning transmission directivity of an array antenna.

At the time of correcting the subject transmission weight, the transmission weight processing unit 21 first compares the delay amount $\beta$ of reception timing for the immediate SRS (hereinafter referred to as "first delay amount $\beta$") with the delay amount $\beta$ of reception timing for the subject SRS (hereinafter referred to as "second delay amount $\beta$") used for calculation of the subject transmission weight. When the first delay amount $\beta$ is larger than the second delay amount $\beta$, the transmission weight processing unit 21 determines that the subject communication terminal 2 is more distant from the base station 1 than when receiving the subject SRS, and the subject transmission weight is corrected (adjusted) so as to increase the transmission distance of the subject transmitted signal. FIG. 11 is a view showing a beam 600 for the transmission directivity of the array antenna 13 which corresponds to the subject transmission weight before and after correction. In FIG. 11, the beam 600 for the transmission directivity of the array antenna 13 which corresponds to the subject transmission weight before correction is indicated by a wavy line, while the beam 600 for the transmission directivity of the array antenna 13 which corresponds to the subject transmission weight after correction is indicated by a solid line. Further, in FIG. 11, the subject communication terminal 2 at the time of the base station 1 receiving the subject SRS is indicated by a wavy line, while the subject communication terminal 2 at the time of the subject transmitted signal being transmitted from the base station 1 is indicated by a solid line. The same applies to undermentioned FIGS. 12 to 14.

When the first delay amount β is larger than the second delay amount β, as shown in FIG. 11, since the subject communication terminal 2 is more distant from the base station 1 than when receiving the subject SRS, the subject transmission weight is corrected such that the beam 600 extends while the orientation of the beam 600 remains unchanged, thereby increasing the possibility for the subject transmitted signal to be appropriately received in the subject communication terminal 2. That is, the accuracy in subject transmission weight improves.

Figure 12:
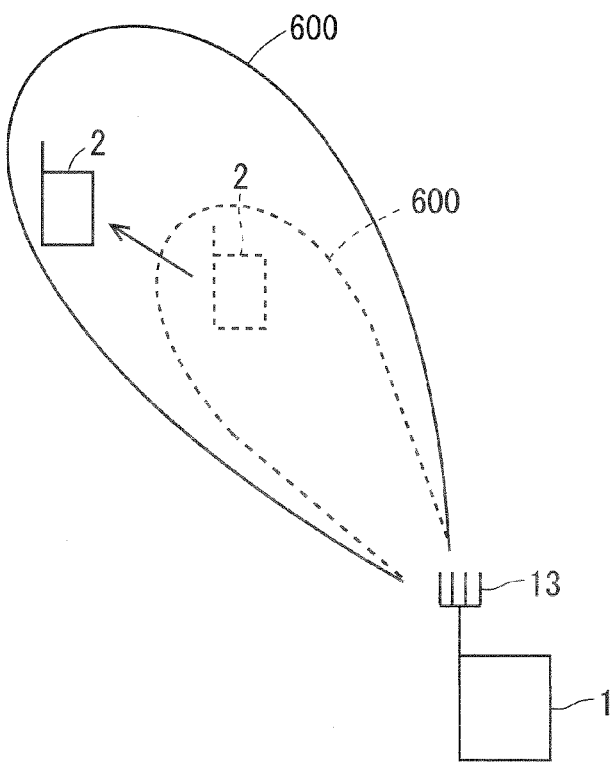
FIG. 12 is a view showing one example of the beams concerning transmission directivity of the array antenna.

It should be noted that, since the subject communication terminal 2 does not necessarily move as shown in FIG. 11, namely since it does not necessary move in a direction connecting the position before the move and the base station 1, it is desirable to correct the subject transmission weight so as to increase the width of the beam 600 while increasing the transmission distance of the subject transmitted signal, as shown in FIG. 12. This allows the subject communication terminal 2 to appropriately receive the subject transmitted signal regardless of the moving direction of the subject communication terminal 2.

Figure 13:
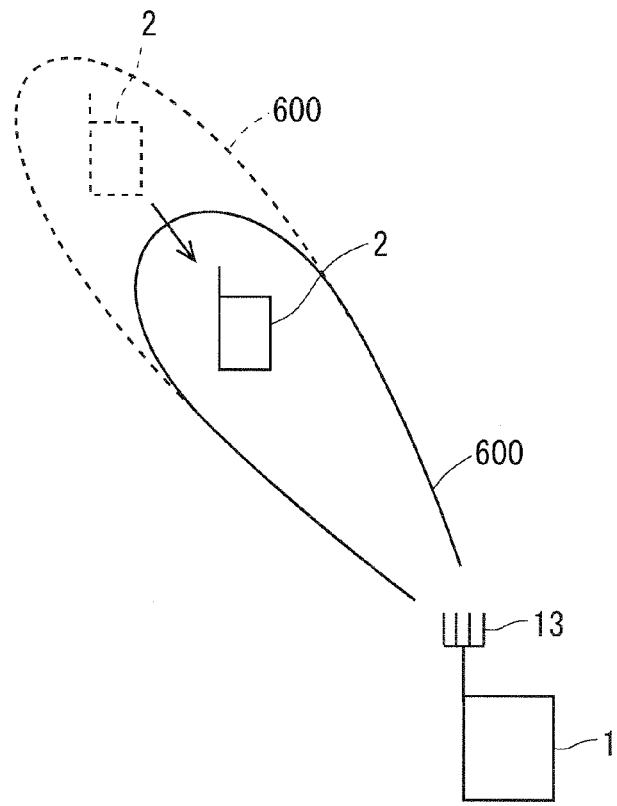
FIG. 13 is a view showing one example of the beams concerning transmission directivity of the array antenna.

On the other hand, when the first delay amount β is smaller than the second delay amount β, the transmission weight processing unit 21 determines that the subject communication terminal 2 is closer to the base station 1 than when receiving the subject SRS, and the subject transmission weight is corrected (adjusted) so as to decrease the transmission distance of the subject transmitted signal. FIG. 13 is a view showing the beam 600 for the transmission directivity of the array antenna 13 which corresponds to the subject transmission weight before and after correction in the case of the first delay amount β being smaller than the second delay amount β.

When the first delay amount β is smaller than the second delay amount β, as shown in FIG. 13, since the subject communication terminal 2 is closer to the base station 1 than when receiving the subject SRS, the subject transmission weight is corrected such that the beam 600 becomes shorter while the orientation of the beam 600 remains unchanged, thereby allowing transmission of the subject transmitted signal to the subject communication terminal 2 while suppressing interference with the periphery. That is, the accuracy in subject transmission weight improves.

Figure 14:
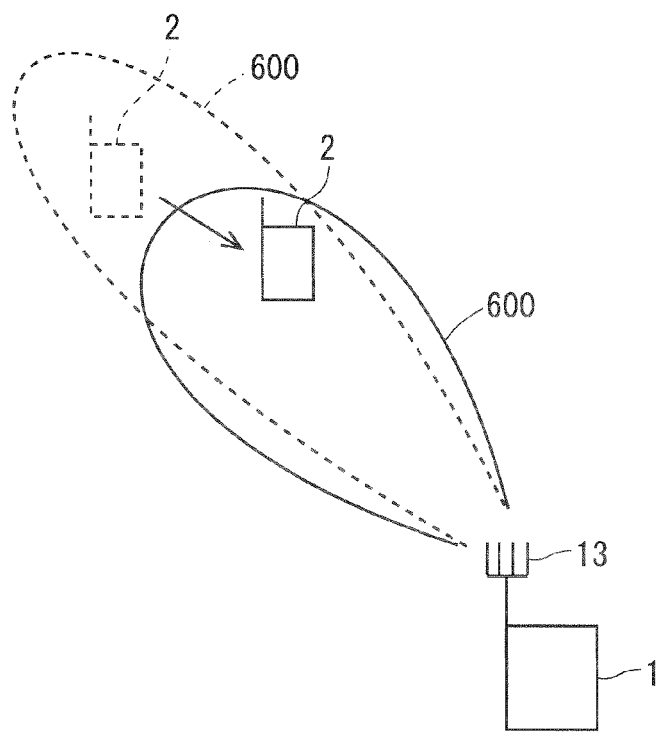
FIG. 14 is a view showing one example of the beams concerning transmission directivity of the array antenna.

It should be noted that, since the subject communication terminal 2 does not necessarily move in a direction connecting the position before the move and the base station 1 as shown in FIG. 13, it is desirable to correct the subject transmission weight so as to increase the width of the beam 600 while decreasing the transmission distance of the subject transmitted signal, as shown in FIG. 14. This allows the subject communication terminal 2 to appropriately receive the subject transmitted signal regardless of the moving direction of the subject communication terminal 2.

When the first delay amount β and the second delay amount β are the same, the transmission weight processing unit 21 sets the subject transmission weight to the subject transmitted signal without correcting the subject transmission weight. Alternatively, the transmission weight processing unit 21 corrects the subject transmission weight such that the width of the beam 600 increases while the transmission distance of the subject transmitted signal remains the same. In the case of the latter, even when the subject communication terminal 2 moves such that the relative distance from the base station 1 remains unchanged, it is possible to make the subject communication terminal 2 appropriately receive the subject transmitted signal.

In addition, the correction amount with respect to the subject transmission weight may be changed in accordance with the amount of the difference between the first delay amount β and the second delay amount β.

For example, when the first delay amount β is larger than the second delay amount β, the correction amount of the subject transmission weight is changed in accordance with an absolute value of the difference therebetween such that a transmission distance of the transmitted signal at the time of the absolute value being not smaller than a predetermined amount is larger than a transmission distance of a transmitted signal at the time of the absolute value being smaller than the predetermined amount. This can further improve the accuracy in transmission weight.

Further, when the first delay amount β is smaller than the second delay amount β, the correction amount of the subject transmission weight is changed in accordance with an absolute value of the difference therebetween such that a transmission distance of the transmitted signal at the time of the absolute value being not smaller than a predetermined amount is smaller than a transmission distance of a transmitted signal at the time of the absolute value being smaller than the predetermined amount. This can further improve the accuracy in transmission weight.

As thus described, according to the present embodiment, when there exists another SRS which was received after the SRS used for calculation of a transmission weight that is set to a transmitted signal and whose transmission frequency band is different from the above SRS, the transmission weight is corrected based on the delay amount β of reception timing for another SRS. This can improve the accuracy in transmission weight. Hence the transmission performance of the base station 1 improves.

It is to be noted that, although the SRS has been exemplified as the known signal used at the time of calculating a transmission weight in the foregoing embodiment, even when a transmission weight is calculated based on another known signal, the transmission weight can be corrected in a similar manner. As described above, in LTE, the known signal called a demodulation reference signal (DRS), which is primarily used at the time of calculating a reception weight that is set to a received signal including user data, has been defined, but even in the case of calculating a transmission weight based on this known signal, the transmission weight can be corrected in a similar manner.

Further, although the case of applying the present invention to the base station of LTE in the foregoing embodiment, the present invention can be applied to a base station of another communication system. Moreover, the present invention can be applied to a communication device other than the base station.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS 1 base station
2 communication terminal
13a antenna
20 weight processing unit 28 delay amount acquiring unit
222 reception weight calculating unit
600 beam

The invention claimed is:

1. A communication apparatus for communicating with a communication partner apparatus, the communication apparatus comprising:
- a plurality of antennas;
- a weight processing unit for calculating, based on a signal group, a plurality of transmission weights for performing beam-forming and null-steering concerning transmission directivity of the plurality of antennas, and setting the calculated plurality of transmission weights respectively to a plurality of transmitted signals transmitted respectively by the plurality of antennas, the signal group being formed of a plurality of known signals transmitted by the communication partner apparatus and being received respectively by the plurality of antennas; and
- a delay amount acquiring unit for obtaining a delay amount of the signal group from the communication partner transmitting the signal group until the plurality of antennas receive the signal group,
- wherein in the case of setting the plurality of transmission weights calculated based on a first signal group which is the signal group, to the plurality of transmitted signals, when there exists a second signal group, the weight processing unit corrects the plurality of transmission weights using the delay amount concerning the second signal group and sets the corrected plurality of transmission weights to the plurality of transmitted signals, the second signal group being the signal group which is the known signal received by the plurality of antennas after the plurality of antennas receive the first signal group and which is transmitted with a transmission frequency band different from a transmission frequency band of the first signal group.

2. The communication apparatus according to claim 1, wherein the weight processing unit corrects the plurality of transmission weights so as to increase a transmission distance of the plurality of transmitted signals when the delay amount concerning the second signal group is larger than the delay amount concerning the first signal group.

3. The communication apparatus according to claim 2, wherein the weight processing unit corrects the plurality of transmission weights so as to increase a transmission distance of the plurality of transmitted signals and increase a width of a beam concerning transmission directivity of the plurality of antennas when the delay amount concerning the second signal group is larger than the delay amount concerning the first signal group.

4. The communication apparatus according to claim 1, wherein the weight processing unit corrects the plurality of transmission weights so as to decrease a transmission distance of the plurality of transmitted signals when the delay amount concerning the second signal group is smaller than the delay amount concerning the first signal group.

5. The communication apparatus according to claim 4, wherein the weight processing unit corrects the plurality of transmission weights so as to decrease a transmission distance of the plurality of transmitted signals and increase a width of a beam concerning transmission directivity of the plurality of antennas when the delay amount concerning the second signal group is smaller than the delay amount concerning the first signal group.

6. The communication apparatus according to claim 1, wherein a frequency band usable for transmission of the signal group is divided into a plurality of partial frequency bands, and the transmission frequency band of the signal group is sequentially set to any one of the plurality of partial frequency bands.

7. The communication apparatus according to claim 1, wherein the weight processing unit corrects, using the delay amount concerning the second signal group transmitted with a transmission frequency band different from a transmission frequency band of the first signal group, the plurality of transmission weights calculated based on the first signal group, and sets the corrected plurality of transmission weights to the plurality of transmitted signals each having a frequency band included in the transmission frequency band of the first signal group.

8. A communication method for communicating with a partner communication apparatus by use of a plurality of antennas, the method comprising the steps of:
- (a) calculating, based on a signal group, a plurality of transmission weights for performing beam-forming and null-steering concerning transmission directivity of the plurality of antennas, and setting the calculated plurality of transmission weights respectively to a plurality of transmitted signals transmitted respectively by the plurality of antennas, the signal group being formed of a plurality of known signals transmitted by the communication partner apparatus and being received respectively by the plurality of antennas; and
- (b) obtaining a delay amount of the signal group from the communication partner apparatus transmitting the signal group until the plurality of antennas receive the signal group,
- wherein in the case of setting the plurality of transmission weights calculated based on a first signal group which is the signal group, to the plurality of transmitted signals in the step (a), when there exists a second signal group, the plurality of transmission weights are corrected using the delay amount obtained in the step (b) concerning the second signal group, and the corrected plurality of transmission weights are set to the plurality of transmitted signals, the second signal group being the signal group which is received by the plurality of antennas after the plurality of antennas receive the first signal group and which is transmitted with a transmission frequency band different from a transmission frequency band of the first signal group.

9. The communication apparatus according to claim 1, further comprising a resource allocation unit that allocates a frequency-hopping method to the communication partner apparatus, wherein the frequency-hopping method comprises:
- the communication partner apparatus transmitting a known signal on a partial frequency band for each of a plurality of sets of transmission periods, wherein, for each transmission period within a single set of transmission periods, the communication partner apparatus transmits the known signal on a partial frequency band that is different than a partial frequency band on which the known signal is transmitted in any of the other transmission periods within the single set of transmission periods, and wherein, for each of the sets of transmission periods, the communication partner apparatus transmits the known signal over an entire transmittable frequency band consisting of each partial frequency band.

* * * * *